US012024931B2

(12) United States Patent
Kemp

(10) Patent No.: US 12,024,931 B2
(45) Date of Patent: Jul. 2, 2024

(54) DOOR VIEWPORT WITH CROSS-DOOR LOCKING BAR

(71) Applicant: James E. Kemp, Miami, FL (US)

(72) Inventor: James E. Kemp, Miami, FL (US)

( * ) Notice: Subject to any disclaimer, the term of this patent is extended or adjusted under 35 U.S.C. 154(b) by 254 days.

(21) Appl. No.: 17/580,197

(22) Filed: Jan. 20, 2022

(65) Prior Publication Data

US 2022/0145677 A1 May 12, 2022

Related U.S. Application Data

(62) Division of application No. 16/351,032, filed on Mar. 12, 2019, now Pat. No. 11,268,309.

(51) Int. Cl.
*E05C 19/00* (2006.01)
*E06B 7/30* (2006.01)

(52) U.S. Cl.
CPC .............. *E05C 19/003* (2013.01); *E06B 7/30* (2013.01); *E05Y 2900/132* (2013.01); *Y10T 292/23* (2015.04); *Y10T 292/37* (2015.04)

(58) Field of Classification Search
None
See application file for complete search history.

(56) References Cited

U.S. PATENT DOCUMENTS 327,373 A 9/1885 Yarnall
698,326 A 4/1902 Schwab
795,712 A 7/1905 Kupsch
1,508,919 A 1/1924 Cain
1,686,942 A 1/1928 Thielker
1,965,725 A 4/1933 Smith et al.
2,222,691 A 5/1938 Taigman
2,130,216 A 9/1938 Zaninovich
4,057,274 A 11/1977 Gompel
(Continued)

FOREIGN PATENT DOCUMENTS

CN 203856378 U 10/2014
CN 105484648 A 4/2016
(Continued)

OTHER PUBLICATIONS

Avocet Hardware, "Affinity Door Knocker—Quick Fit—Face Mounted," avocet-hardware.co.uk, Dec. 29, 2018, https://web.archive.org/web/20181229050158, capture Jan. 2018.
(Continued)

*Primary Examiner* — Carlos Lugo
(74) *Attorney, Agent, or Firm* — The Concept Law Group, P.A.; Robert C. Kain, Jr.; Scott D. Smiley

(57) ABSTRACT

The door viewport with cross-door locking bar laterally spans the door frame with a viewport exterior lip on the door and an interior face plate near an interior of the door forming, in one instance, a mid-bar capture channel. Alternatively, the viewport has an interior extension coacting with a complementary interlocking element on the cross-bar's midpoint. Either construct holds the cross-door locking bar substantially at its mid-point. Cross-bar terminal end mounts removably attach the cross-bar to the door frame. One type of mount is an L-bracket. Another type of mount is a controllable transverse extension member forcing a door frame plate against the door frame. A user-controlled extension means forces the cross-door locking bar away from the door frame plate, with either a screw drive system or a grooved rod with spring loaded lever control.

6 Claims, 6 Drawing Sheets

(56) References Cited

U.S. PATENT DOCUMENTS

| | | | |
|---|---|---|---|
| 4,067,598 | A | 1/1978 | Mansour |
| 4,082,332 | A | 4/1978 | Palmer |
| 4,330,147 | A | 5/1982 | Nolen |
| 4,529,235 | A | 7/1985 | Florentine, Sr. |
| 4,667,992 | A | 5/1987 | Roden, Jr. |
| 4,779,910 | A | 10/1988 | Dameron |
| 4,852,921 | A | 8/1989 | Gilbert et al. |
| 5,426,891 | A | 6/1995 | Svehaug |
| 5,447,345 | A | 9/1995 | Daley |
| 5,466,023 | A | 11/1995 | Williamson |
| 5,496,081 | A | 3/1996 | Rice |
| 5,580,108 | A | 12/1996 | Bergstein |
| 5,605,364 | A | 2/1997 | Shelledy |
| 5,669,641 | A | 9/1997 | Jeansonne |
| 5,741,033 | A | 4/1998 | Everett |
| 5,899,509 | A | 5/1999 | Ferguson et al. |
| 6,073,335 | A | 6/2000 | Lampers |
| 6,454,323 | B1 | 9/2002 | Mills |
| 6,779,305 | B2 | 8/2004 | Harter |
| D540,150 | S | 4/2007 | Wilson et al. |
| 7,552,554 | B1 | 6/2009 | Marquardt et al. |
| 7,578,255 | B2 | 8/2009 | Pittenger |
| 9,487,975 | B2 | 11/2016 | Daniels et al. |
| 9,702,160 | B2 | 7/2017 | Wirtz |
| 10,022,005 | B2 | 7/2018 | Carpinelli |
| 10,184,278 | B2 | 1/2019 | Lowe |
| 2010/0154306 | A1 | 6/2010 | Driggers |
| 2014/0306464 | A1 | 10/2014 | Lowe |
| 2018/0209187 | A1 | 7/2018 | Lowe |

FOREIGN PATENT DOCUMENTS

| | | | |
|---|---|---|---|
| CN | 108952523 | A | 12/2018 |
| FR | 2554495 | A1 | 5/1985 |
| GB | 2373810 | A | 10/2002 |
| JP | 2004183478 | A | 7/2004 |
| JP | 4871057 | B2 | 2/2012 |

OTHER PUBLICATIONS

Assa Abloy “Cross Bar 9M29, Not Lockable” secure.effeff.de, Dec. 29, 2018 https://web.archive.org/web/20181229044147/https://secure.effeff/index.php?. capture Jan. 2019.

Edimax, “Smart Wireless Peephole Door Camera, Nov. 27, 2016, ”https://web.archive.org/web/20161127172326; http://www.edimax.com:80/edimax/merchandise, Capture Jan. 2019.

DOOR VIEWPORT WITH CROSS-DOOR LOCKING BAR

This is a divisional Patent application based upon and claiming the benefit of pending patent application Ser. No. 16/351,032, filed Mar. 12, 2019, the contents of which is incorporated herein by reference thereto. The present invention relates to a door viewport, commonly called a peephole, with a cross door locking bar which is adapted to prohibit a swing out door from being opened when the cross door locking bar is deployed laterally across both the door and the door frame. The term "cross door" is synonymous with "cross-door."

BACKGROUND OF THE INVENTION

Although viewport peepholes are well known and cross-door bars are also well known, no one has effectively combined these two distinct elements together.

U.S. Pat. No. 5,669,641 to Jeansonne discloses a door securing device that includes a telescoping crossbar that is positionable across the door to be secured and securable at either end to the building structure adjacent the door. Jeansonne '641 does not disclose a peep-hole or view port disposed at a central location on a cross-bar which secures the door. In more detail, Jeansonne '641 includes a pivot anchor having a threaded pivot anchor securing portion at a first pivot anchor end and a positioning tab extending radially outward from a second pivot anchor end, a latch anchor having a threaded latch anchor securing portion at a first latch anchor end, a partial spherical latch ball secured to a second latch anchor end in a manner such that a longitudinal axis of said latch anchor passes through said center of said latch ball. A latching shoulder extending radially outward from a side of said latch anchor at a location a first distance away from said latch ball. A telescoping cross-bar has a pivot section having a first outer diameter, a circular cross-section, and a tubular latch section said tubular latch section having a first internal diameter sized to slidingly and rotatably receive therein at least a portion of said pivot section. The pivot section includes a pivot hub at one end thereof having a hub channel formed that is sized to captively receive a section of said pivot anchor therein including said positioning tab, said positioning tab being insertable into said hub channel through a tab access slot formed through a first hub channel end. The pivot hub has a first storage slot formed through a second end thereof that is angularly offset from said tab access slot, said first storage slot being sized to receive therein said positioning tab. The latch section includes a circular latch ball receiving aperture formed through a sidewall thereof at a first latch section end and a latch anchor receiving slot formed in connection with said latch ball receiving aperture along a portion of a circumference of said first latch section end, said latch ball having a diameter greater than said latch anchor receiving slot and less than said latch ball receiving aperture. An adjustable door assembly includes a contact securing mechanism, securable to and positionable along at least a portion of said latch section and a user positionable bumper plate that is positionable and securable at a plurality of user selected positions with respect to said latch section.

U.S. Pat. No. 2,222,691 to Taigman discloses a lock including a casing provided with means for mounting it on one side of a door, a face plate provided with means for mounting the same on the opposite side of the door and provided with a key actuated cylinder, an eye-piece mounted for rotary movement in the casing and providing an exposed handle, and a barrel secured to the face plate with its bore forming a continuation of the bore of the eye piece and coacting therewith to provide a sight opening extending through the lock casing in offset relation to its lock actuating mechanism. Taigman '691 does not show a cross-bar lock.

U.S. Pat. No. 795,712 to Kupsch discloses a key retaining and locking device for doors provided with an independent key-operated lock comprising a locking bar adapted to be inserted through the key, the bar having a movably-mounted casing on one end and a rigidly-mounted casing on the other end. Kupsch 712 does not show a viewport at a central location on a cross-bar door lock.

U.S. Pat. No. 4,057,274 to Van Gompel discloses a cross-door door brace and security apparatus comprising a cylindrical locking means slidably engaging a retaining member in an aperture in the door and detachable spring-loaded locking pins. Van Gompel '274 does not show a central viewport.

U.S. Pat. No. 6,073,335 to Lampers discloses a conventional viewport or peephole through a door with an interior door hanger. The method supports an object on the exterior of a door equipped with a flanged peep hole fixture comprising the peep hole barrel passing through the hanger piece hole.

U.S. Pat. No. 1,965,725 to Smith et al discloses a peephole and a rod pivotally attached to a shutter, over an opening to look through, and a secondary latch of a lock plate.

U.S. Pat. No. 5,741,033 to Everett discloses a crossbar door lock system extending across a door and over a door jamb and pivoting on said door at one point and providing a positive, nonfrictional latch at another point and received through a ring collar and latching to a doorknob. Everett does not disclose a peephole at a central location on a cross-bar door lock. Accordingly, there is a need for a peephole having a structure to grasp or co-act a midsection of the crossbar and to utilize simple and easy to release door frame mounts disposed at the terminal ends of the cross door locking bar.

SUMMARY OF THE INVENTION

The door viewport peephole has a cross-door locking bar adapted to be deployed on an interior-side of a swing-out door and door frame. The viewport-peephole with a cross-door locking bar includes a cross-door locking bar adapted to laterally span the door frame and the door. The peephole viewport is adapted to be mounted in a pass-through aperture of the door. The viewport has an exterior facing lip adapted to be adjacent and adjoining an exterior surface of the door. The viewport also has an interior face plate adapted to be adjacent or near an interior surface of the door. The interior face plate forms part of the mid-bar capture channel. The mid-bar capture channel holds the cross-door locking bar and mechanically captures a generally mid-region of the cross-door bar. The system includes a pair of cross-bar mounts to be mounted on the door frame, at opposite sides of the door and the frame. Each cross-bar mount coacts with the door frame at a terminal end region of the cross-door locking bar.

In a first locked position, the cross-door bar is disposed in the mid-bar capture channel and the terminal ends of the cross-door bar are disposed in the cross-bar mounts on opposite sides of the door frame. In an unlocked position, the cross-door bar is withdrawn from the mid-bar capture channel and the terminal end regions of the cross-door bar are withdrawn from corresponding cross-bar mounts. In both positions, the peephole viewport is adapted to permit interior-to-exterior views through the door in both the first and the second positions. Generally, the user removes the cross-door bar by loosening the cross-bar mounts near the door frame, withdrawing the cross-bar from the mid-bar capture channel and placing the bar aside, thereby permitting the user to swing open the door, outside the frame and adjacent home or building structure.

Further enhancements to the viewport-peephole with a cross-door bar include a two-piece viewport with a first piece defining the exterior facing lip and a second piece defining the interior face plate. The first and second pieces are threaded together to form the peephole viewport which is mounted in the pass-through aperture of the door.

The second piece of the peephole viewport may include a door lip adapted to coact on the interior surface of the door (that is, adjoining the door) such that when the first and second pieces are threaded together, the exterior facing lip is mounted on the exterior surface of the door and the door lip on the second piece is mounted on the interior surface of the door. These lips grip the door.

As for the cross-bar mounts, one type of mount is an L-shaped bracket attached to the door frame. Another type of mount is a screw-down mount. Rather than a screw down mount, the transverse extension rod may be a spring loaded jack (similar to a force grip plier or jack system) or a grooved rod with a spring loaded lock lever. The lever tooth mates with the grooved rod to lock the transverse extension rod against the door frame.

The cross-bar mount may include a door frame plate adapted to be forced against the door frame by a controllable transverse extension member having, at its terminal end, the door frame plate. The transverse extension member is movably mounted to the corresponding terminal end region of the cross-door locking bar and has a user-controlled extension means for forcing the cross-door locking bar away from the door frame plate. By transversely moving the cross bar a way from the door frame the viewport pull the mid-region of the door inboard, thereby prohibiting the door to swing outward or outboard. The controllable transverse extension member may further includes a user-actuated tactile member to rotate the threaded rod relative to the threaded element.

To facilitate cross-door bar removal, the transverse extension member may include a laterally disposed cross-bar passage therethrough to movably retain the cross-bar therein such that the transverse extension member is adapted to move laterally over the cross-bar. Motion "laterally" refers to left and right movement with respect to the vertically mounted door in the door frame. "Transverse" movement refers to movement towards or away from the interior or inside surface of the door. However, lateral movement may also refer to a diagonally positioned cross-bar over the door. In other words, "lateral" is not exclusively horizontal in nature.

A further feature is cross-bar lock at the cross-bar passage. The cross-bar lock grips the cross-bar in or near the cross-bar passage such that in a cross-bar locked condition, lateral movement of the cross-bar in the cross-bar passage is prohibited.

It should be noted that one cross-bar mount may be an L-shaped bracket and the other cross-bar mount can be the controllable transverse extension member having at its terminal end the door frame plate.

Another embodiment of the invention is a dual cross-bar system and a mid-bar complementary viewport/cross-bar locking system.

BRIEF DESCRIPTION OF THE DRAWINGS

Further objects and advantages of the present invention can be found in the detailed description of the embodiments went taken in conjunction with the accompanying drawings.

FIG. 5 shows the transverse extension member having a lateral crossbar passage and a crossbar lock grip permitting lateral movements of the crossbar with respect to the transverse extension member.

FIG. 7 also illustrates the use of dual cross-door bars.

DETAILED DESCRIPTION OF EMBODIMENTS OF THE INVENTION

The present invention relates to a door viewport, commonly called a peephole, with a cross door locking bar which is adapted to prohibit a swing out door from being opened when the cross door locking bar is deployed laterally across both the door and the door frame.

Figure 1:
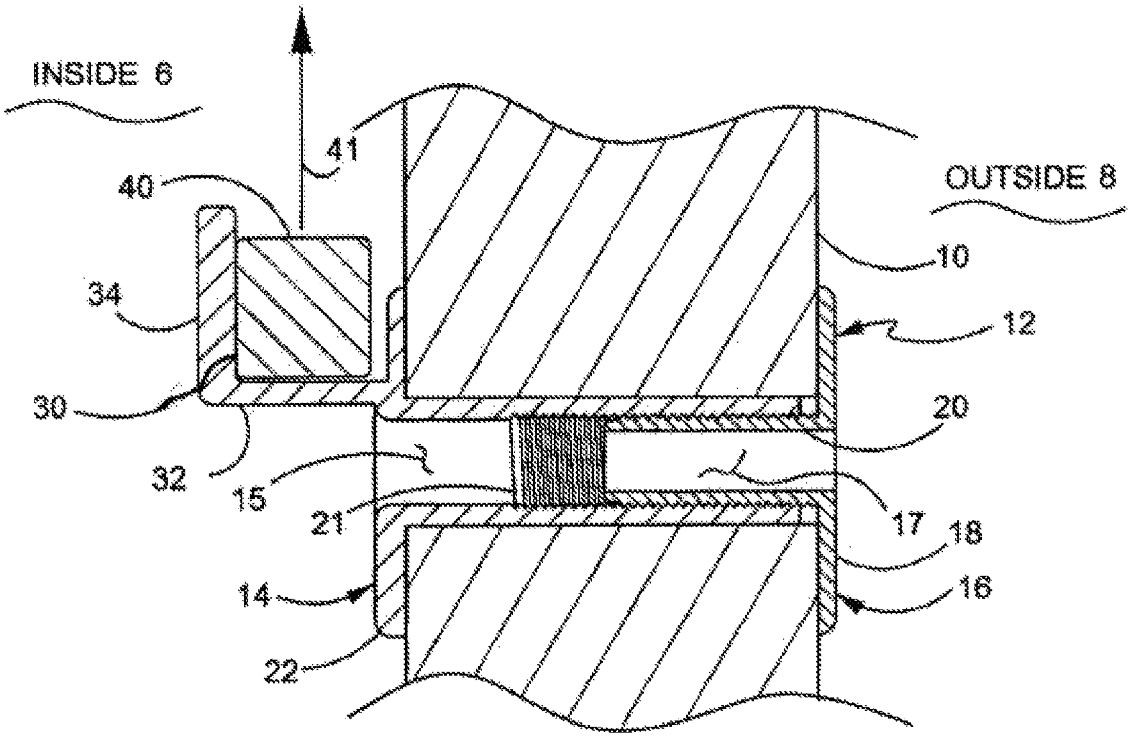
FIG. 1 diagrammatically illustrates the viewport peephole mounted in a pass-through aperture of the door and shows the mid-bar capture channel for the cross door locking bar.
Figure 2:
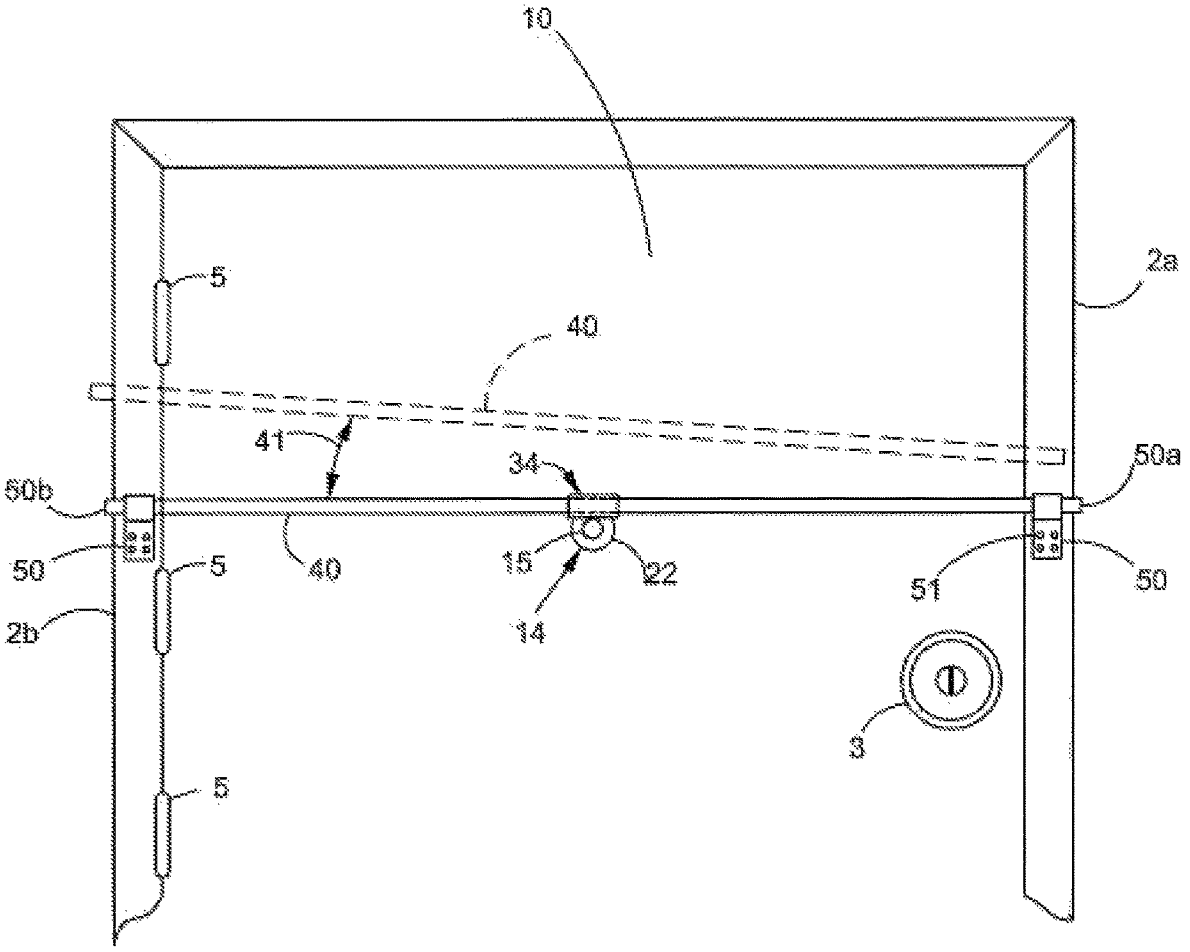
FIG. 2 diagrammatically illustrates the cross door bar, the mid-bar capture channel having the cross door bar disposed therein and a pair of crossbar mounts mounted on the door frame and retaining respective terminal end regions of the cross door bar. The cross door bar has been moved in FIG. 2 as shown in phantom lines.

FIGS. 1 and 2 are discussed concurrently herein. FIG. 1 diagrammatically illustrates the viewport peephole 12 mounted in a pass-through aperture of the door 10 and shows the mid-bar capture channel 30 formed partly by interior face plate 34 for the cross door locking bar 40. FIG. 2 diagrammatically illustrates the cross door bar 40, the mid-bar capture channel having an interior face plate 34 having the cross door bar disposed in the bar channel 30 and a pair of crossbar mounts 50 mounted on the door frame 2*a*, 2*b* and retaining respective terminal end regions 50*a*, 50*b* of the cross door bar 40 therein. As shown in phantom lines, the cross door bar 40 has been moved jpwards in direction 41 in FIG. 2.

In FIG. 1, door 10 swings from the closed position to an open position identified as outside 8. As shown in FIG. 2, hinges 5 permit that outside swing of door 10 when the user opens door lock 3. Door 10 is hung on door frame. The door frame includes two vertical frame members 2*a*, 2*b*. Although cross door bar 40 is shown horizontally spanning door frame members 2*a*, 2*b*, different configurations of the viewport peephole—cross door locking bar system can be structured to provide a diagonal mount of cross door bar 40 rather than the horizontal mount shown in FIG. 2.

Viewport peephole 12 includes an exterior facing lip 16 which is adjacent and adjoining the exterior surface of door 10. In the illustrated embodiment, viewport 12 is a two—piece viewport with one piece defining the exterior facing lip 16 and a second piece defining an interior door lip 14 and interior faceplate 34. Interior faceplate 34 defines a mid-bar capture channel 30. Cross door bar 40 is shown in FIG. 1 as being disposed in capture channel 30. The crossbar can be withdrawn from capture panel 30 with the user moving the crossbar upwards as shown by arrow 41.

The two-piece viewport peephole 12 is threaded together such that a viewing passageway is formed by passageway segments 15, 17. The two-piece viewport 12 also includes a door lip 14 formed on the second piece of viewport peephole 12. In this manner, when the viewport peephole 12 is mounted in the pass-through aperture of the door, the exterior facing lip 16 grips the exterior surface of door 10 and door lip 22 is mounted to and adjoining the interior surface of door 10, thereby securely mounting the viewport peephole 12 on door 10.

Although around, cylindrical pass-through is shown in the drawings, the pass-through may be configured in any manner with any shape. Further, viewport peephole 12 may include optical lenses to improve the view through the peephole from the inside to the outside. As is commonly known, a user would stand inside the door, shown as inside 6 in FIG. 1, and view persons or objects outside the door.

The terminal end regions 50*a*, 50*b*, of cross door bar 40 are removably mounted to door frames 2*a*, 2*b* by L-shaped brackets 50. These L-shaped brackets are mounted via screws, nails or other mounting means using apertures 51 in the L-shaped bracket 50.

Figure 3:
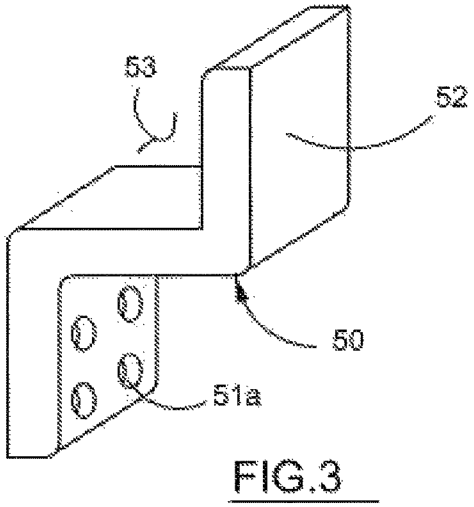
FIG. 3 diagrammatically illustrates one crossbar mount which is an L-shaped bracket.

FIG. 3 diagrammatically illustrates the L-shaped bracket and one of the apertures 51*a*. The L-shaped bracket forms a bar channel 53 which retains cross door bar 40 when the bar is deployed across the doorframe. The L-shaped bracket includes a plate which is adjoining the doorframe and the plate has through-passages 51*a* permitting the L-bracket to be mounted to the doorframe. The L-bracket also has upstanding leg 52 which is spaced away from the doorframe thereby forming bar capture region 53.

Figure 4:
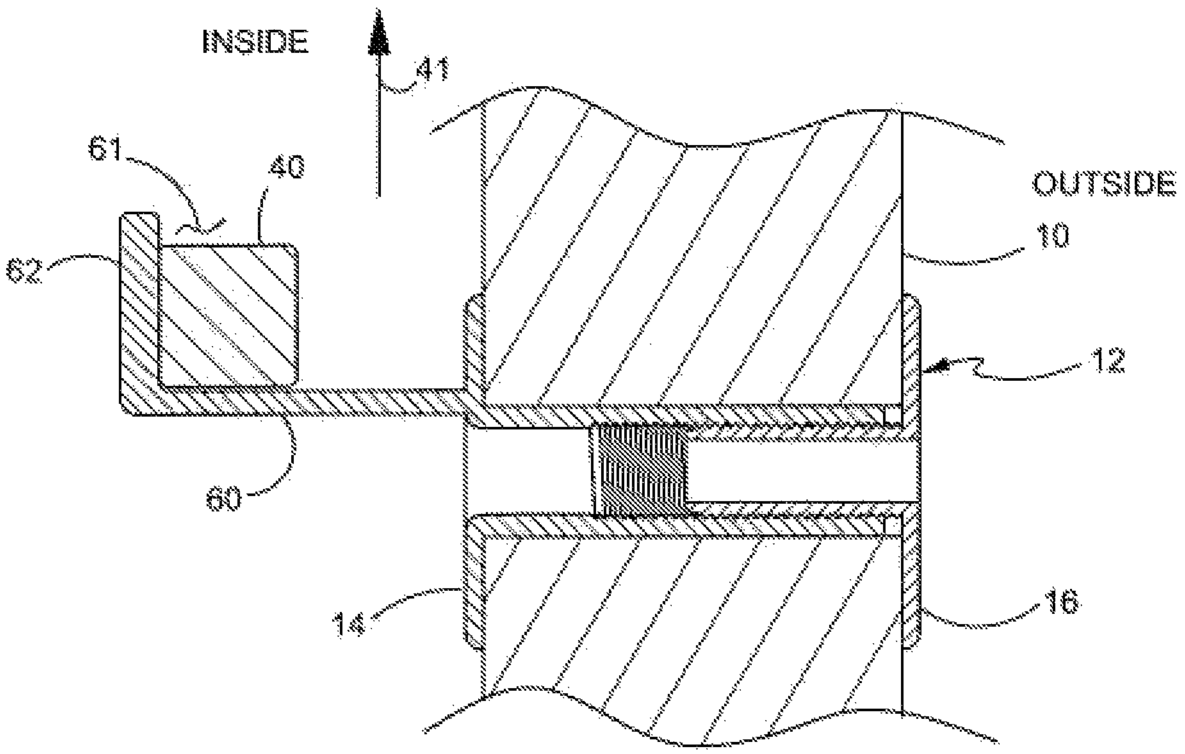
FIG. 4 diagrammatically illustrates the viewport peephole with a door lip adjoining the interior surface of the door wherein the interior face plate of the viewport peephole is spaced transversely away from the door lip, the interior face lip forming a portion of the mid-bar capture channel.
Figure 5:
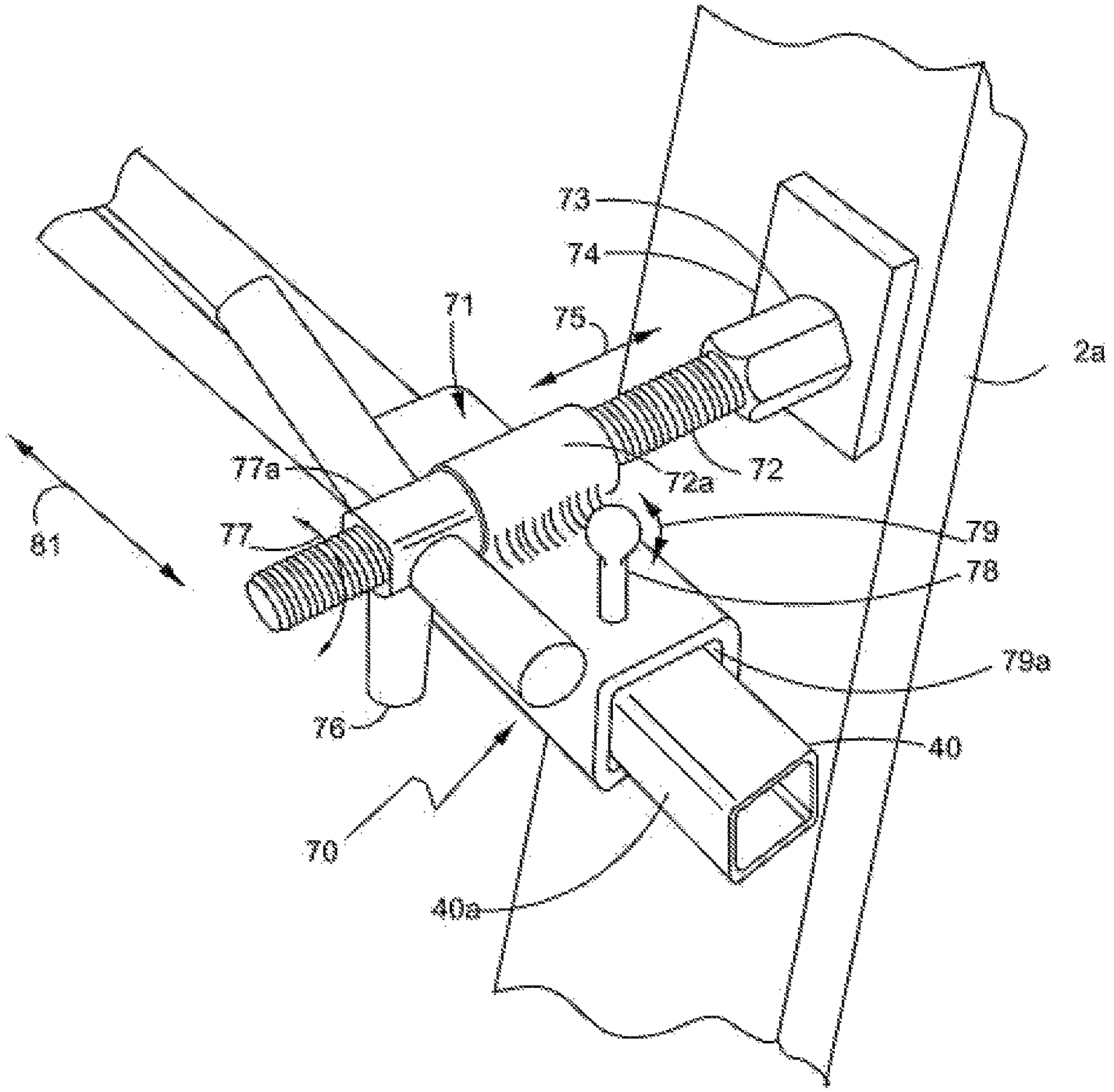
FIG. 5 diagrammatically illustrates a cross-bar mount with a door frame plate pressed against the door frame and a controllable transverse extension member having a user-controlled extension means for forcing the cross door bar away from the door and the door frame plate. Also.

FIGS. 4 and 5 are discussed currently herein. In some instances, doorframe 2*a*, 2*b* are disposed in a vertical plane which is farther inboard or to the inside of the home or building as compared with the inside or inboard surface of door 10. In other words, door 10 is inset into frame 2*a*, 2*b*. In these situations, it may be necessary to transversely extend mid-bar capture channel 61 to a more inboard position relative to door lip 14 of the viewport peephole 12. FIG. 4 shows that the interior faceplate 62 of peephole 12 extends transversely inboard with respect to door lip 14. Stated otherwise, the mid-bar capture channel 61 occupies a much larger transverse space. The mid-bar capture channel 61 is formed by interior faceplate 62 and transversely extending plate element 60.

FIG. 5 diagrammatically illustrates a cross-bar mount 70 which forces a door frame plate 74 against doorframe 2*a*. Cross-bar mount 70 includes a controllable transverse extension member 77 which has a terminal end 73 abutting or mounted on doorframe plate 74. The transverse extension member 77 is movably mounted with respect to terminal end region 40*a* of cross-door bar 40. Further, the transverse extension member 77 includes a user controlled extension means (generally 77*a*) for forcing the cross door bar 40 transversely away from doorframe plate 74 and door frame 2*a*. The transverse movement of transverse extension number 77 is shown by the double-headed arrow 75.

In FIG. 5, the means for forcing 77*a* is a threaded rod 72 coacting with a threaded elements 72*a* in the interior 71 of transverse extension member 77. Threaded rod 72 is rotated by a user actuated tactile member 76 to rotate the threaded rod 72 relative to internal threaded elements 71 formed in the interior of transverse extension member 77.

Since the lateral span of any particular door or doorframe may be different, there is a need to have controllable transverse extension member 77 at variable lateral locations on and about crossbar 40. FIG. 5 diagrammatically illustrates that controllable transverse extension member 77 and cross-bar mount 70 is permitted to move laterally with respect to crossbar 40 via crossbar passage 79*a*. Crossbar 40 is movably retained within crossbar passage 79*a* and further within the controllable transverse extension member 77 and cross bar mount 70. In order to lock any lateral movement of bar mount 70 with respect to crossbar 40, crossbar mount 70 includes a crossbar lock 78 at crossbar passage 79*a*. In the illustrated embodiment, crossbar lock 78 is a threaded stem passing through a threaded passage in the crossbar mount 70. The terminal end of the crossbar lock 78 grips crossbar 40 in or near the crossbar passage 79*a*. Crossbar lock has a user actuation surface shown as a thumbscrew which rotates in directions 79 to either grip crossbar 40 with respect to crossbar mount 70 or to release such impact grip on bar 40. As explained earlier, controllable transverse extension member 77 may take many forms other than the screw down extension member shown in FIG. 5. For example, a force grip system could be utilized or a system wherein the transverse extension member 72 has a series of grooves or cuts and a spring-loaded lever is mounted on or in cross-bar mount 70 such that the end or tooth of the lever is biased into the grooves or cuts such that when the user forces the grooved rod 72 towards doorframe plate 74 that the biased lever tooth falls into the more transverse groove on grooved rod 72. To release extension member 77, the user depresses the spring loaded lever and the lever tooth is withdrawn from the rod grooves permitting the user to transversely move member 77 away from frame 2*a*.

Figure 6:
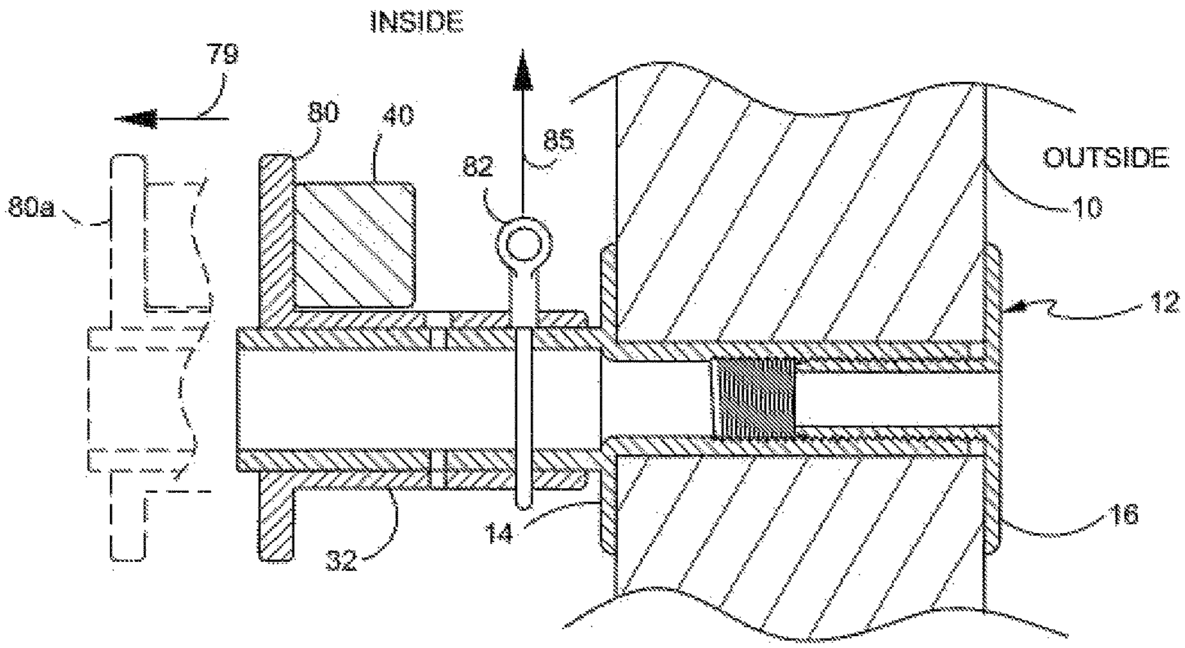
FIG. 6 diagrammatically illustrates a pin release permitting withdrawal of the cross door bar from the peephole viewport. The viewport is pin locked to the cross-bar.

FIG. 6 diagrammatically shows a pin lock to lock the crossbar 40 onto a transverse extension 32 extending inboard from door lip 14 of peephole 12. The cross door bar 40 includes, at a substantially mid-midway position on the bar, an interlocking element 80. The interlocking element is complementary to the inboard extension 32 of peephole 12. A lock is provided for locking the cross door locking bar, the interlocking element 80, the inboard extension 32 and peephole 12 together. In FIG. 6, this lock is pin lock 82 with a stem 84 that passes through aligned apertures in interlocking element 80 and inboard extension 32.

Figure 7:
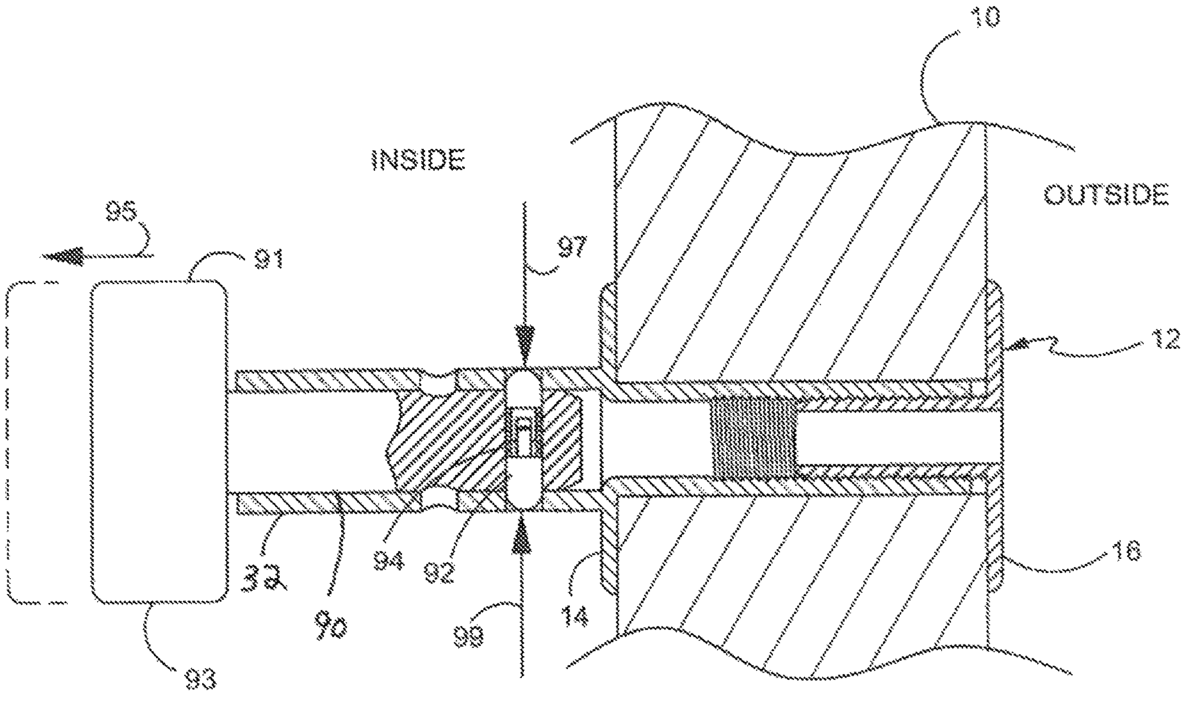
FIG. 7 diagrammatically illustrates a spring clip button release permitting withdrawal of the cross-bar from the interior elements of the peephole viewport.

In FIG. 7, the interlocking element includes a spring-loaded pushbutton lock 92 having spring 94 and pushbutton controls 97, 99. In FIG. 7, the interlocking element 90 includes a male element complementary to the female inboard extending extension 32. In FIG. 6, the interlocking element 80 includes a female element with respect to male inboard extension 32.

Further, in FIG. 7, the cross-bar locking bar includes two lateral locking bars 91, 93. In FIG. 6, the cross door bar 40 is unlocked from peephole 12 by lifting lock 82 upwards in the direction shown by arrow 85. The phantom lines in FIG. 6 show the withdrawn and unlocked position of the bar with respect to the peephole.

In FIG. 7, the pushbutton control 92 is depressed as shown by arrows 97, 99 and the double bar 91, 93 is withdrawn as shown by arrow 95. In FIG. 7, the inboard surface 33 of inboard extension 32 is adjacent and adjoining interlocking element 90.

The claims appended hereto are meant to cover modifications and changes within the scope and spirit of the present invention.

The invention claimed is:

1. A door barricade adapted to be deployed on an interior-side of a swing-out door and door frame comprising:

a cross-door locking bar adapted to laterally span said door frame and said door;

a peephole viewport comprising an exterior body coupled to an interior body, said exterior body having an exterior facing lip adapted to be adjacent an exterior surface of said door, said interior body having an interior facing lip adapted to be adjacent an interior surface of said door, said interior body having an extension extending from said interior lip; an interlocking element defining an interlocking element extension fitted onto said extension of said interior body, said interlocking element defining an interlocking element face plate extending from the interlocking element extension and a mid-bar capture channel defined between said interior lip and said interlocking element extension and said interlocking face plate for supporting said cross-door locking bar;

a lock stem configured to be extending through said extension and said interlocking element in a first configuration for locking said cross-door locking bar, said interlocking element, said extension and said peephole viewport together and a second configuration for locking said interlocking element, said extension and said peephole viewport together but allowing removal of said cross-door locking bar;

a pair of cross-bar mounts, a respective cross-bar mount of said pair of cross-bar mounts adapted to be mounted on said door frame at a corresponding one terminal end region of said cross-door locking bar;

in a first locked position, said cross-door locking bar disposed in said mid-bar capture channel and said corresponding terminal end regions of said cross-door locking bar disposed in respective cross-bar mounts on opposite sides of said door frame; and in an unlocked position, said cross-door locking bar withdrawn from said mid-bar capture channel and said respective terminal end regions of said cross-door locking bar withdrawn from corresponding cross-bar mounts;

whereby said peephole viewport is adapted to permit interior-to-exterior views through said door in both said first and said second positions.

2. The door barricade as claimed in claim 1 wherein said lock stem is (a) a pin lock extending through said interlocking element and said extension, or (b) a spring loaded push button lock coacting with said interlocking element and said extension.

3. The door barricade as claimed in claim 2 wherein said interior body and said exterior body are threaded together.

4. The door barricade as claimed in claim 3 wherein one cross-bar mount of said pair of cross-bar mounts defines an L-shaped bracket wherein said corresponding terminal end region of said cross-door locking bar is disposed in said L-shaped bracket when said one cross-bar mount is mounted on said door frame.

5. The door barricade as claimed in claim 3 wherein one cross-bar mount of said pair of cross-bar mounts includes a door frame plate adapted to be forced against said door frame, and includes a controllable transverse extension member having at its terminal end said door frame plate, said transverse extension member movably mounted to said corresponding terminal end region of said cross-door locking bar and having a user-controlled extension means for forcing said cross-door locking bar away from said door frame plate.

6. The door barricade as claimed in claim 5 wherein said means for forcing is a threaded rod coacting with a threaded element in said controllable transverse extension member and further includes a user-actuated tactile member to rotate the threaded rod relative to said threaded element.

* * * * *